United States Patent
Kim et al.

(12) 
(10) Patent No.: US 10,721,952 B2
(45) Date of Patent: Jul. 28, 2020

(54) JAM MIX COMPOSITION FOR MICROWAVE COOKING, JAM USING SAME, AND METHOD FOR PREPARING SAME

(71) Applicant: CJ CHEILJEDANG CORPORATION, Seoul (KR)

(72) Inventors: Taek Beom Kim, Goyang-si (KR); Mi Jung Kim, Suwon-si (KR); Sang Bum Lee, Seoul (KR); Seung Won Park, Yongin-si (KR); Jung Gyu Park, Incheon (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 162 days.

(21) Appl. No.: 15/550,880

(22) PCT Filed: Jan. 25, 2016

(86) PCT No.: PCT/KR2016/000757
§ 371 (c)(1),
(2) Date: Aug. 14, 2017

(87) PCT Pub. No.: WO2016/140436
PCT Pub. Date: Sep. 9, 2016

(65) Prior Publication Data
US 2018/0035700 A1 Feb. 8, 2018

(30) Foreign Application Priority Data

Mar. 5, 2015 (KR) ........................ 10-2015-0030698

(51) Int. Cl.
*A23L 21/10* (2016.01)
*A23L 21/12* (2016.01)
*A23L 27/10* (2016.01)
*A23L 29/20* (2016.01)

(52) U.S. Cl.
CPC .............. *A23L 21/10* (2016.08); *A23L 21/12* (2016.08); *A23L 27/10* (2016.08); *A23L 29/20* (2016.08); *A23V 2002/00* (2013.01)

(58) Field of Classification Search
CPC .......... A23L 21/10; A23L 21/12; A23L 27/10; A23L 29/20
USPC ....................................................... 426/573
See application file for complete search history.

(56) References Cited

U.S. PATENT DOCUMENTS

| | | | | |
|---|---|---|---|---|
| 4,036,998 A | * | 7/1977 | Ruff | A23L 21/25 426/302 |
| 2007/0065558 A1 | * | 3/2007 | Ding | A23L 29/244 426/578 |
| 2011/0195170 A1 | * | 8/2011 | Shigemura | A23C 9/1307 426/548 |
| 2013/0230631 A1 | * | 9/2013 | Maeshima | A23G 3/346 426/577 |

FOREIGN PATENT DOCUMENTS

| | | |
|---|---|---|
| CN | 103200829 A | 7/2013 |
| EP | 1414312 B1 | 11/2006 |
| JP | 2000-139369 A | 5/2000 |
| JP | 2007-54021 A | 3/2007 |
| JP | 2008-142048 A | 6/2008 |
| KR | 10-2001-0100032 A | 11/2001 |
| KR | 10-0349623 B1 | 8/2002 |
| KR | 10-0892042 B1 | 4/2009 |
| KR | 10-2012-0097443 A | 9/2012 |
| KR | 10-2013-0070269 A | 6/2013 |
| KR | 10-1355872 B1 | 1/2014 |
| KR | 10-2014-0032940 A | 3/2014 |

OTHER PUBLICATIONS

Office Action dated Oct. 4, 2016 of corresponding Korean Patent Application No. 10-2015-0030698—5 pages.
Notice of Allowance dated Mar. 7, 2017 of corresponding Korean Patent Application No. 10-2015-0030698—1 page.
International Search Report dated Apr. 27, 2016 of PCT/KR2016/000757 which is the parent application and its English translation—4 pages.
Office Action of corresponding Chinese Patent Application No. 201680013937.X—7 pages. (dated May 6, 2020).

* cited by examiner

*Primary Examiner* — Jyoti Chawla
(74) *Attorney, Agent, or Firm* — Knobbe Martens Olson & Bear LLP

(57) ABSTRACT

The present invention relates to a jam mix composition for microwave cooking, the composition comprising fats and oils; jam using the same; and a method for preparing the same. The jam mix composition of the present invention has advantages in that the convenience for jam cooking is enhanced, a jam production time is shortened, the freshness and texture of fruits or vegetables are maintained, and destruction of nutrients can be minimized.

14 Claims, 1 Drawing Sheet

Fig. 1

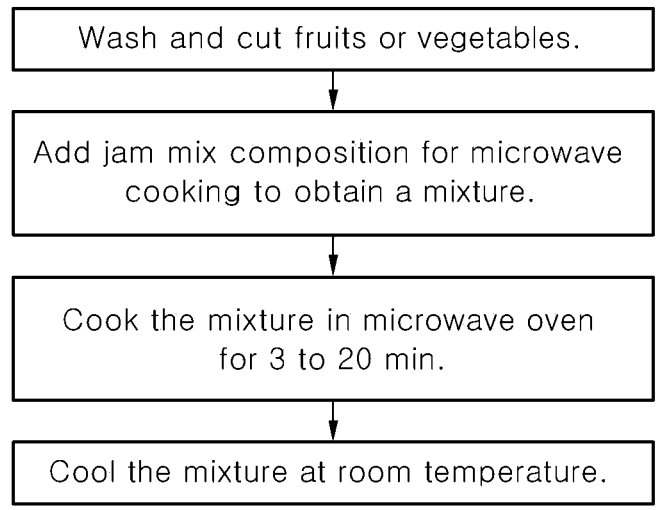

Fig. 2

Process of preparing typical household jam

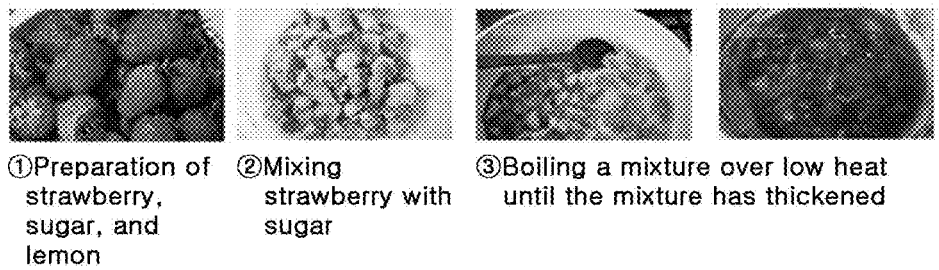

①Preparation of strawberry, sugar, and lemon  ②Mixing strawberry with sugar  ③Boiling a mixture over low heat until the mixture has thickened Process of preparing jam simply using jam mix composition for microwave cooking

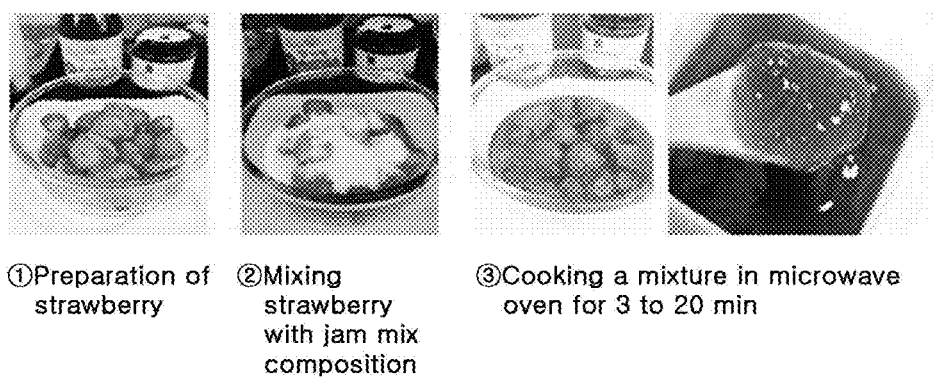

①Preparation of strawberry  ②Mixing strawberry with jam mix composition  ③Cooking a mixture in microwave oven for 3 to 20 min

JAM MIX COMPOSITION FOR MICROWAVE COOKING, JAM USING SAME, AND METHOD FOR PREPARING SAME

TECHNICAL FIELD

The present invention relates to a jam mix composition for microwave cooking, a jam using the same, and a method for preparing the same.

BACKGROUND ART

Jam is a preserve of fruit boiled with a large quantity of sugar and is highly viscous, and the high concentration of sugar in the jam can prevent growth and development of microorganisms, thereby allowing long-term preservation. Jam is generally eaten by spreading on bread, such as toast or rolls, alone or together with butter, rather than eaten alone. Jam was a method of preserving fruits for future use in colder regions of Europe, and, recently, has been consumed widely as a food.

Generally, jam has good storage stability but is likely to boil over during cooking thereof. Thus, there is an inconvenience that a person always needs to carefully watch over-boiling while constantly stirring the jam. In addition, since sensory properties of fruit jam vary greatly depending on recipe, it is difficult to prepare fruit jams having consistent quality at home.

In order to solve this problem, a household jam sugar composition was proposed in which thickening agents such as pectin and citric acid, which contribute to gel formation, are mixed with a saccharide such as sugar. However, such a jam sugar composition has a problem in that contents of a jam are likely to boil over during heat-cooking and thus a person watch constantly.

(Patent document 1) Korean Patent Laid-Open Publication No. 2012-0097443 (published on Sep. 4, 2012)

(Patent document 2) Korean Patent No. 10-1355872 (issued on Jan. 21, 2014)

DETAILED DESCRIPTION

Technical Problem

It is one aspect of the present invention to provide a jam mix composition for microwave cooking, which can be easily and rapidly cooked in a microwave oven to prepare a fruit or vegetable jam at home and can maintain the form and texture of a fruit or vegetable as a main raw material, while minimizing destruction of nutrients.

It is another aspect of the present invention to provide a method for preparing a jam mix composition for microwave cooking, which allows components having different particle sizes to be uniformly distributed throughout the composition, whereby jams prepared using the composition can be consistent in quality.

Technical Solution

In accordance with one aspect of the present invention, there is provided a jam mix composition for microwave cooking which comprises dietary fats and oils.

In accordance with another aspect of the present invention, there is provided a method for preparing a jam mix composition for microwave cooking which comprises: mixing a sweetener with a thickening agent and fats and oils; coating the mixture by spraying or sprinkling a liquid citric acid onto the mixture; and drying the coated mixture.

In accordance with a further aspect of the present invention, there is provided a method for preparing a jam using the jam mix composition for microwave cooking according to the aspects of the present invention.

Advantageous Effects

The present invention provides a jam mix composition for microwave cooking which can provide an improved cooking convenience, shorten the time required for preparation of a jam, preserve freshness and texture of fruits or vegetables; and minimize nutrient destruction.

DESCRIPTION OF DRAWINGS

FIG. 1 is a schematic flowchart illustrating a method of preparing a jam using a jam mix composition for microwave cooking according to one aspect of the present invention.

FIG. 2 shows images for comparing a strawberry jam preparation process using a jam mix composition for microwave cooking according to one aspect of the present invention with a typical strawberry jam preparation process using sugar.

EMBODIMENTS

Hereinafter, aspects of the present invention will be described in detail. It should be noted that descriptions of details apparent to those skilled in the art will be omitted for clarity.

One aspect of the present invention relates to a jam mix composition for microwave cooking which comprises dietary fats and oils.

The present invention provides a jam mix composition for microwave cooking which comprises fats and oils to prevent a jam from boiling over during heat-cooking of the jam, thereby to improve cooking convenience, and has an improved heating resistance, and thus can enable to prepare a jam having a soft texture.

Specifically, the fats and oils may comprise at least one selected from the group consisting of vegetable fats and oils; animal fats and oils; and hydrogenated oil, fractionated oil, transesterified oil, powdered fats and oils, and an emulsifier obtained therefrom.

More specifically, the fats and oils may be hydrogenated vegetable fats and oils, still more specifically powdered hydrogenated vegetable fats and oils (fat content: 70% to 98%). When one of the powdered hydrogenated vegetable fats and oils is used, fine fats and oils particles are dispersed in a food to facilitate formation of a gel having a network structure, thereby allowing the resulting jam to have a soft texture and to be easily soluble in the mouth, while the fats and oils can prevent the jam from foaming during heat-cooking, as a main effect of the fats and oils.

The fats and oils may be present in an amount of 0.01 wt % to 10 wt % in the jam mix composition for microwave cooking. Specifically, the fats and oils may be present in an amount of 0.01 wt % to 5 wt %, more specifically 0.01 wt % to 1 wt % in the jam mix composition. If the amount of the fats and oils is below this range, the fats and oils cannot efficiently prevent a jam from boiling over during heat-cooking of the jam, whereas if the amount of the fats and oils exceeds this range, this can affect sensory properties of a prepared jam and can increase the time required for preparation of a jam.

The jam mix composition for microwave cooking according to the present invention may further comprise a sweetener, citric acid, and a thickening agent in addition to the fats and oils.

The sweetener may comprise a general sweetener alone or comprise at least two selected from the group consisting of a general sweetener, sugar alcohols, and a high-intensity sweetener.

The general sweetener allows a prepared jam to have inherent sweetness, thereby to provide desired sensory properties. In addition, the general sweetener is highly viscous and contains a high concentration of sugar capable of preventing growth and development of microorganisms, thereby enabling long-term preservation.

Specifically, the general sweetener may comprise sugar, glucose, xylose, tagatose, psicose, starch syrup, sugar syrup, dextrin, maltose, fructooligosaccharide, isomaltooligosaccharide, maltooligosaccharide, xylooligosaccharide, chitooligosaccharide, and mixtures thereof, without being limited thereto.

The sugar alcohols and the high-intensity sweetener have flavor-enhancing properties equivalent to sugar while having low calorie content.

Examples of the sugar alcohols may comprise sorbitol, mannitol, lactitol, maltitol, xylitol, erythritol, and mixtures thereof, without being limited thereto.

Examples of the high-intensity sweetener may comprise aspartame, acesulfame K, sodium cyclamate, sodium saccharin, sucralose, stevia sweetener, dulcin, thaumatin, neotame, monellin, monk fruit, and mixtures thereof, without being limited thereto.

The sweetener may be present in an amount of 82 wt % to 99.997 wt % in the jam mix composition for microwave cooking. Specifically, the sweetener may be present in an amount of 90 wt % to 99.997 wt %, more specifically 95 wt % to 99.997 wt % in the jam mix composition.

When a mixture of the general sweetener and the sugar alcohols is used as the sweetener, the general sweetener and the sugar alcohols may be used in amounts of 50 parts by weight to 90 parts by weight and 10 parts by weight to 50 parts by weight, respectively, relative to 100 parts by weight of the entire sweetener.

In addition, the high-intensity sweetener may be present in an amount of 0.008 wt % to 5 wt % in the jam mix composition for microwave cooking. Within this range, the high-intensity sweetener can provide excellent properties in terms of early sweetness quality and late sweetness balance. If the amount of the high-intensity sweetener is below 0.008 wt %, early sweetness is insufficient, whereas, if the amount of the high-intensity sweetener exceeds 5 wt %, a prepared jam can taste bitter as unique taste of high-intensity sweetener, or exhibit excessively strong late sweetness. Specifically, the high-intensity sweetener may be present in an amount of 0.05 wt % to 1.5 wt % in the jam mix composition.

For example, when a mixture of the general sweetener and the high-intensity sweetener is used as the sweetener, the general sweetener and the high-intensity sweetener may be used in amounts of 95 parts by weight to 99.992 parts by weight and 0.008 parts by weight to 5 parts by weight, respectively, relative to 100 parts by weight of the entire sweetener. In addition, when a mixture of the general sweetener, the sugar alcohols, and the high-intensity sweetener is used as the sweetener, the general sweetener, the sugar alcohols, and the high-intensity sweetener may be used in amounts of 45 parts by weight to 89.992 parts by weight, 10 parts by weight to 50 parts by weight, and 0.008 parts by weight to 5 parts by weight, respectively, relative to 100 parts by weight of the entire sweetener.

The citric acid may be added to maintain a pH of 2.8 to 3.5, which is the optimum pH for pectin gel formation. The citric acid may be present in an amount of 0.01 wt % to 3 wt % in the jam mix composition for microwave cooking.

The thickening agent may comprise at least one selected from the group consisting of gelatin, pectin, guar gum, xanthan gum, carrageenan, methyl cellulose, sodium alginate, and locust bean gum, without being limited thereto. The thickening agent serves to enhance viscosity of a jam to reinforce physical properties. Specifically, the thickening agent may comprise gelatin and/or pectin, more specifically, pectin.

The thickening agent may be present in an amount of 0.01 wt % to 5 wt % in the jam mix composition for microwave cooking. Specifically, the thickening agent may be present in an amount of 0.01 wt % to 3 wt % in the jam mix composition.

If the amount of the thickening agent is outside this range, a prepared jam cannot have a suitable viscosity for spread on a food and it may not reinforce sufficiently physical properties of the jam.

Next, a method for preparing a jam mix composition for microwave cooking according to the present invention will be described.

In one aspect, there is provided a method for preparing a jam mix composition for microwave cooking in which each of components of the composition is mixed and coated to enhance uniformity in their particle size and distribution.

Generally, the jam mix composition for microwave cooking according to the present invention may be provided in powder form. The jam mix composition according to the present invention may be prepared by simply mixing powdered components. However, when the powdered components having different particle sizes are simply mixed, content uniformity of the mixture can be declined, causing deterioration in both product quality and ease of use.

In order to solve this problem, a method may be employed in which some of the components having different particle sizes, for example, a sweetener, a thickening agent, and fats and oils are primarily mixed, followed by spray or sprinkle coating with a solution of citric acid. Thus, this method has an advantage in that particle size uniformity is increased throughout the composition.

The method for preparing a jam mix composition for microwave cooking according to this aspect of the present invention comprises: mixing the sweetener, the thickening agent, and the fats and oils; coating the mixture by spraying or sprinkling the liquid citric acid onto the mixture; and drying the coated mixture.

In another aspect, the liquid citric acid is a solution of citric acid dissolved in purified water and may be present in an amount of 0.05 wt % to 5 wt % based on the total weight of the jam mix composition.

Specifically, the mixture may be coated by spraying or sprinkling 0.05 wt % to 5 wt % of a solution of citric acid dissolved in purified water based on the total weight of the jam mix composition such that the citric acid is present in an amount of 0.01 wt % to 3 wt % in the jam mix composition. More specifically, spray or sprinkle coating may be performed by using 0.1 wt % to 1 wt % of the solution of citric acid dissolved in purified water.

In addition, drying of the coated mixture may be performed until the jam mix composition has a water content of about 0.3 wt % or less.

A further aspect of the present invention relates to a jam prepared using the jam mix composition for microwave cooking according to the aspects of the present invention.

Yet another aspect of the present invention relates to a method of preparing a jam using the jam mix composition for microwave cooking according to the aspects of the present invention.

The jam may be prepared by mixing the jam mix composition for microwave cooking according to the present invention with a raw material such as a fruit or vegetable and heating the mixture in a microwave oven, followed by cooling the mixture.

In the present invention, the fruit may comprise at least one selected from among strawberries, grapes, persimmons, oranges, apples, cherries, peaches, plums, apricot, lemons, grapefruits, figs, bananas, and kiwis, without being limited thereto.

In the present invention, the vegetable may comprise at least one selected from among carrots, zucchinis, bell peppers, onions, celeries, tomatoes, broccolis, and cabbages, without being limited thereto.

These fruits and vegetables may be used alone or as a mixture thereof.

When a large fruit or vegetable is used, it is desirable that the fruit or vegetable be cut to a size of 3 cm or less (in length, width, and thickness) or be ground in a blender. If the size of the fruit or vegetable exceeds 3 cm, it is difficult to properly feel the texture of the fruit or vegetable, and a liquid and a flesh of the fruit or vegetable are formed as separate layers during preparation of the jam and contents are not uniformly distributed throughout the jam, causing deterioration in product quality.

A small fruit such as strawberries, grapes, and cherries may be used without being cut.

The jam mix composition for microwave cooking may be mixed with raw materials such as fruits by any suitable method generally used. By way of example, strawberries are hulled and washed with water, followed by removal of water from surfaces of the strawberries. Then, based on 100 wt % of the strawberries, 70 wt % to 100 wt % of the jam mix composition is uniformly applied to the surfaces of the strawberries, followed by stirring with a spoon or the like.

Heating and cooling of the mixture may be performed under varying conditions depending on specific environments. By way of example, the mixture may be heated in a 500 W to 1000 W microwave oven for 3 to 20 minutes, followed by cooling at room temperature, thereby preparing the jam according to this aspect of the present invention.

Next, the present invention will be described in more detail with reference to examples. However, it should be noted that these examples are provided for illustration only and should not be construed in any way as limiting the invention.

EXAMPLE

Example 1

98.99 wt % of sugar (BEKSUL, CJ CheilJedang Co., Ltd.) was simply mixed with 0.90 wt % of pectin (CP Kelco) as a thickening agent, 0.01 wt % of citric acid (Jungbunzlauer AG), and 0.10 wt % of powdered hydrogenated vegetable fats and oils (Matsutani Chemical Industry Co., Ltd., fat content: 70% to 98%), thereby preparing a jam mix composition for microwave cooking.

Examples 2 to 4

Sugar (BEKSUL, CJ CheilJedang Co., Ltd.), pectin (CP Kelco) as a thickening agent, citric acid (Jungbunzlauer AG), and powdered hydrogenated vegetable fats and oils (Matsutani Chemical Industry Co., Ltd., fat content: 70% to 98%) were mixed together in amounts as listed in Table 1 through a procedure in which the sugar, the thickening agent, and the powdered fats and oils were primarily mixed, followed by coating with a solution of the citric acid. Then, the mixture coated with the citric acid was dried, thereby preparing a jam mix composition for microwave cooking.

Example 5

A jam mix composition for microwave cooking was prepared in the same manner as in Examples 2 to 4, except that sugar (BEKSUL, CJ CheilJedang Co., Ltd.) and erythritol (Zibo Zhongshi Green Biotech Co., Ltd.) as sweeteners, pectin (CP Kelco) as a thickening agent, citric acid (Jungbunzlauer AG), and powdered hydrogenated vegetable fats and oils (Matsutani Chemical Industry Co., Ltd., fat content: 70% to 98%) were mixed together in amounts as listed in Table 1.

Example 6

A jam mix composition for microwave cooking was prepared in the same manner as in Examples 2 to 4, except that sugar (BEKSUL, CJ CheilJedang Co., Ltd.), erythritol (Zibo Zhongshi Green Biotech Co., Ltd.), and sucralose (JK Sweet) as sweeteners, pectin (CP Kelco) as a thickening agent, citric acid (Jungbunzlauer AG), and powdered hydrogenated vegetable fats and oils (Matsutani Chemical Industry Co., Ltd., fat content: 70% to 98%) were mixed together in amounts as listed in Table 1.

Amounts of the components used to prepare the jam mix compositions of Examples 1 to 6 are shown in Table 1.

TABLE 1

| | | Mixing ratio(unit: wt %) | | | | | |
| --- | --- | --- | --- | --- | --- | --- | --- |
| Component | | Example 1 | Example 2 | Example 3 | Example 4 | Example 5 | Example 6 |
| Sweetener | Sugar | 98.99 | 98.99 | 98.09 | 94.09 | 86.99 | 60.94 |
| | Erythritol | | | | | 12.00 | 38.00 |
| | Sucralose | | | | | | 0.05 |
| Pectin | | 0.90 | 0.90 | 0.90 | 0.90 | 0.90 | 0.90 |
| Citric acid | | 0.01 | 0.01 | 0.01 | 0.01 | 0.01 | 0.01 |
| Powdered fats and oils | | 0.10 | 0.10 | 1.00 | 5.00 | 0.10 | 0.10 |
| Total | | 100.00 | 100.00 | 100.00 | 100.00 | 100.00 | 100.00 |

Comparative Example 1

100 wt % of sugar (BEKSUL, CJ CheilJedang Co., Ltd.) is used in this comparative example.

Comparative Example 2

100 wt % of a typical jam sugar composition (strawberry jam sugar, Dr. Oetker) is used in this comparative example.

Comparative Example 3

A mixture of 99.09 wt % of sugar (BEKSUL, CJ CheilJedang Co., Ltd.), 0.90 wt % of pectin (CP Kelco) as a thickening agent, and 0.01 wt % of citric acid (Jungbunzlauer AG) (not including fats and oils) is used in this comparative example.

Experimental Example 1: Convenience of Microwave Cooking (Comparison of Degree of Boiling Over)

100 wt % of each of the jam mix compositions prepared in Examples 1 to 6 and Comparative Examples 1 to 3 was applied to 100 wt % of hulled strawberries, thereby preparing a mixture.

Then, in order to determine the degree of boiling over, 350 ml of the mixture was placed in a 500 ml glass container, followed by observed the degree of boiling over of the mixture during heating the mixture in a 700 W microwave oven. Results are shown in Table 2.

Experimental Example 2: Comparison of Microwave Cooking Time 100 wt % of each of the jam mix compositions prepared in Examples 1 to 6 and Comparative Examples 1 to 3 was applied to 100 wt % of hulled strawberries, thereby preparing a mixture. Thus, the mixture was heated in a 700 W microwave oven to measure the time taken for physical properties of the mixture to reach the same level as those of a typical strawberry jam (5,100 cP to 6,600 cP). Results are shown in Table 2.

TABLE 2

| Mixture | Viscosity (cP) | Boiling over | Cooking time (min) | Note |
|---|---|---|---|---|
| Example 1 | 5,800 ± 700 | X | 6~15 | Continuous microwave cooking was possible |
| Example 2 | 5,900 ± 300 | X | 6~9 | Continuous microwave cooking was possible |
| Example 3 | 6,000 ± 450 | X | 6~10 | Continuous microwave cooking was possible |
| Example 4 | 5,900 ± 410 | X | 10~15 | Continuous microwave cooking was possible |
| Example 5 | 5,800 ± 400 | X | 6~9 | Continuous microwave cooking was possible |
| Example 6 | 5,700 ± 300 | X | 6~10 | Continuous microwave cooking was possible |
| Comparative Example 1 | 6,000 ± 380 | O | 40~60 | discontinuous microwave cooking was necessary (heating-cooling-heating) |
| Comparative Example 2 | 5,800 ± 300 | O | 30~40 | |
| Comparative Example 3 | 5,600 ± 280 | O | 30~40 | |

As shown in Table 2, it was confirmed that the mixtures using Examples 1 to 6 did not boil over during the heat-cooking and could be continuously cooked, such that a jam was prepared in 3 to 20 minutes in a 700 W microwave oven. Conversely, it was confirmed that the mixtures using Comparative Example 1 using only sugar, Comparative Example 2 using a typical jam sugar, and Comparative 3 not including fats and oils, boiled over and could not be continuously cooked, and thus required a relatively long cooking time.

Experimental Example 3: Sensory Evaluation

Among the mixtures in Experimental Examples 1 and 2, each of the mixtures prepared using Examples 1 and 2 and Comparative Examples 1 and 2 was heated in a 700 W microwave oven until the viscosity of the mixture reached about 5,100 cP to 6,600 cP, and then cooled at room temperature, thereby preparing a strawberry jam.

Each of the prepared strawberry jams was stored at 4° C. for 12 hours and then subjected to sensory evaluation by examining color, sweetness, sourness, viscosity, texture, and overall preference on a 5-point scale. Results are shown in Table 3.

TABLE 3

| Item | Color | Sweetness | Sourness | Viscosity | Texture | Overall preference |
|---|---|---|---|---|---|---|
| Example 1 | 3.0 ± 1.14 | 3.4 ± 1.2 | 3.4 ± 0.8 | 3.3 ± 1.5 | 4.0 ± 0.5 | 3.4 ± 0.7 |
| Example 2 | 3.2 ± 1.1 | 3.3 ± 1.1 | 3.3 ± 0.5 | 3.5 ± 0.5 | 4.3 ± 0.7 | 3.7 ± 0.5 |
| Comparative Example 1 | 3.6 ± 0.5 | 3.3 ± 1.1 | 3.2 ± 0.5 | 3.6 ± 1.2 | 3.6 ± 1.2 | 3.6 ± 1.2 |
| Comparative Example 2 | 3.7 ± 0.5 | 4.0 ± 0.5 | 3.0 ± 0.7 | 3.0 ± 0.6 | 3.9 ± 0.5 | 3.3 ± 0.6 |

As shown in Table 3, it could be seen that Examples 1 and 2 were better in overall sensory performance than Comparative Examples 1 and 2. Particularly, Examples 1 and 2 exhibited excellent sensory properties in terms of texture.

Experimental Example 4: Preparation of Jam Mix and Property Evaluation

Particle sizes of the jam mix compositions for microwave cooking prepared in Examples 1 and 2 and the components thereof to be used were compared and analyzed.

Particle sizes of the jam mix composition of Example 1 prepared by simple mixing without a separate citric acid coating process and the jam mix composition of Example 2 prepared through a citric acid coating process were compared with particles sizes of the components (the sugar, pectin, powdered fats and oils, and citric acid), thereby determining improvement effect in particle size uniformity caused by the preparation method according to the present invention.

The particle size of each composition was analyzed using a particle size analyzer (Particle Size Standard Sieve, Chunggye Industrial Mfg., Co.). Results are shown in Table 4.

TABLE 4

| Item | Composition | | Component | | | |
|---|---|---|---|---|---|---|
| | Example 1 | Example 2 | Sugar | Pectin | Powdered fats and oils | Citric acid |
| Average particle size (μm) | 231 ± 9.2 | 245 ± 18.4 | 219 ± 24.0 | 93 ± 7.2 | 78 ± 11.4 | 363 ± 38.6 |
| Particle size distribution (%) | 26.3 | 36.8 | 32.0 | — | — | — |

As shown in Table 4, it was confirmed that Example 2 prepared through spray/sprinkle coating was better in overall particle size uniformity than Example 1 prepared through simple mixing.

Jams were prepared repeatedly using the jam mix compositions for microwave cooking of Examples 1 and 2, followed by conducted for comparison and analysis of qualities of the jams.

100 wt % of each of the jam mix compositions prepared in Examples 1 to 2 was applied to 100 wt % of hulled strawberries, thereby preparing a mixture. Thus, the mixture was heated in a 700 W microwave oven, thereby preparing a jam. The pH and flowability of the prepared jams were measured repeatedly to confirm a reproducibility in quality.

TABLE 5

| Number of repetition | Example 2 | | | Example 1 | | |
|---|---|---|---|---|---|---|
| | pH | Flowability (mm) | | pH | Flowability (mm) | |
| | | 30 s | 60 s | | 30 s | 60 s |
| 1 | 3.51 | 87 | 100 | 3.63 | 64 | 73 |
| 2 | 3.60 | 90 | 102 | 3.49 | 95 | 105 |
| 3 | 3.63 | 87 | 100 | 3.55 | 85 | 100 |
| 4 | 3.61 | 97 | 111 | 3.54 | 118 | 142 |
| 5 | 3.61 | 98 | 113 | 3.62 | 105 | 118 |
| 6 | 3.66 | 90 | 105 | 3.47 | 116 | 134 |
| 7 | 3.60 | 88 | 103 | 3.56 | 82 | 94 |
| 8 | 3.62 | 90 | 104 | 3.63 | 68 | 78 |
| 9 | 3.61 | 90 | 103 | 3.49 | 106 | 126 |

TABLE 5-continued

| Number of repetition | Example 2 | | | Example 1 | | |
|---|---|---|---|---|---|---|
| | pH | Flowability (mm) | | pH | Flowability (mm) | |
| | | 30 s | 60 s | | 30 s | 60 s |
| 10 | 3.62 | 91 | 104 | 3.64 | 99 | 123 |
| Average | 3.61 | 90.80 | 104.50 | 3.56 | 93.80 | 109.30 |
| Deviation | 0.0 | 3.8 | 4.3 | 0.1 | 18.7 | 23.2 |

As shown in Table 5, it was confirmed that Example 2 prepared through spray/sprinkle coating was better in terms of reproducibility in quality than Example 1 prepared through simple mixing.

The invention claimed is:

1. A jam mix composition for microwave cooking, comprising particles of a mixture which comprises fats and oils, a sweetener, a thickening agent, wherein the particles of the mixture are coated with a citric acid.

2. The jam mix composition according to claim 1, wherein the fats and oils comprise at least one selected from the group consisting of vegetable fats and oils; animal fats and oils; and hydrogenated oil, fractionated oil, transesterified oil, powdered fats and oils, and an emulsifier obtained therefrom.

3. The jam mix composition according to claim 2, wherein the vegetable fats and oils are in powder form.

4. The jam mix composition according to claim 1, wherein the sweetener comprises a general sweetener alone, or at least two selected from the group consisting of a general sweetener, sugar alcohols, and a high-intensity sweetener.

5. The jam mix composition according to claim 4, wherein the general sweetener comprises at least one selected from the group consisting of sugar, glucose, xylose, tagatose, psicose, starch syrup, sugar syrup, dextrin, maltose, fructooligosaccharide, isomaltooligosaccharide, maltooligosaccharide, xylooligosaccharide, and chitooligosaccharide; the sugar alcohols comprise at least one selected from the group consisting of sorbitol, mannitol, lactitol, maltitol, xylitol, and erythritol; and the high-intensity sweetener comprises at least one selected from the group consisting of aspartame, acesulfame K, sodium cyclamate, sodium saccharin, sucralose, *stevia* sweetener, dulcin, thaumatin, neotame, monellin, and monk fruit.

6. The jam mix composition according to claim 4, wherein the sweetener comprises 10 to 90 parts by weight of the general sweetener and 10 to 50 parts by weight of the sugar alcohols, relative to 100 parts by weight of the entire sweetener.

7. The jam mix composition according to claim 4, wherein the sweetener comprises 95 to 99.992 parts by weight of the general sweetener and 0.008 to 5 parts by weight of the high-intensity sweetener, relative to 100 parts by weight of the entire sweetener.

8. The jam mix composition according to claim 4, wherein the sweetener comprises 45 to 89.992 parts by weight of the general sweetener, 10 to 50 parts by weight of the sugar alcohols, and 0.008 to 5 parts by weight of the high-intensity sweetener, relative to 100 parts by weight of the entire sweetener.

9. The jam mix composition according to claim 1, wherein the thickening agent comprises at least one selected from the group consisting of gelatin, pectin, guar gum, xanthan gum, carrageenan, methyl cellulose, sodium alginate, and locust bean gum.

10. The jam mix composition according to claim 1, comprising: 82 wt % to 99.97 wt % of the sweetener; 0.01 wt % to 3 wt % of the citric acid; 0.01 wt % to 5 wt % of the thickening agent; and 0.01 wt % to 10 wt % of the fats and oils.

11. A method for preparing a jam mix composition for microwave cooking, comprising:
 preparing particles of a mixture comprising a sweetener, a thickening agent, and fats and oils;
 spraying or sprinkling a citric acid over the particles and drying the citric acid over the particles to provide the jam mix composition of claim 1.

12. The method according to claim 11, wherein the sweetener, the thickening agent, and the fats and oils are in powder form, wherein preparing the particles of the mixture comprises mixing the sweetener with the thickening agent and the fats and oils.

13. The method according to claim 12, wherein the citric acid is a solution of the citric acid dissolved in purified water and is used in an amount of 0.05 wt % to 5 wt % based on the total weight of the jam mix composition.

14. A method for preparing a jam, comprising:
 providing a fruit or vegetable;
 providing the jam mix composition for microwave cooking according to claim 1;
 mixing the jam mix composition with the fruit or vegetable;
 heating the mixture comprising the fruit or vegetable in a 500 W to 1000 W microwave oven for 3 to 20 minutes; and
 cooling the heated mixture at room temperature.

* * * * *